US008826606B2

(12) United States Patent
Yen

(10) Patent No.: US 8,826,606 B2
(45) Date of Patent: Sep. 9, 2014

(54) SOLAR DEVICE AND FASTENER MECHANISM THEREOF

(75) Inventor: Tung-I Yen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/590,193

(22) Filed: Aug. 21, 2012

(65) Prior Publication Data

US 2014/0000186 A1 Jan. 2, 2014

(30) Foreign Application Priority Data

Jun. 28, 2012 (CN) .......................... 2012 1 0219937

(51) Int. Cl.
*E04D 13/18* (2014.01)

(52) U.S. Cl.
USPC ........... 52/173.3; 52/202; 52/506.06; 24/457; 24/458

(58) Field of Classification Search
USPC .......... 52/173.3, 200, 202, 204.5, 208, 786.1, 52/796.1, 506.01, 506.04, 506.06, 52/306–308, 64, 69, 71–72; 248/500, 505, 248/510
See application file for complete search history.

(56) References Cited

U.S. PATENT DOCUMENTS

| | | | | |
|---|---|---|---|---|
| 3,939,620 A | * | 2/1976 | Bero | 52/717.05 |
| 4,129,360 A | * | 12/1978 | Deflandre et al. | 359/853 |
| 4,184,297 A | * | 1/1980 | Casamayor | 52/202 |
| 4,356,599 A | * | 11/1982 | Larson et al. | 24/16 PB |
| 4,663,905 A | * | 5/1987 | Schulz | 52/202 |
| 4,669,688 A | * | 6/1987 | Itoh et al. | 248/74.2 |
| 5,669,186 A | * | 9/1997 | Verby et al. | 52/72 |
| 5,937,745 A | * | 8/1999 | Boe | 100/2 |
| 6,959,517 B2 | * | 11/2005 | Poddany et al. | 52/173.3 |
| 7,406,800 B2 | * | 8/2008 | Cinnamon et al. | 52/173.3 |
| 7,435,134 B2 | * | 10/2008 | Lenox | 439/567 |
| 8,522,492 B2 | * | 9/2013 | Tachino | 52/173.3 |
| 2005/0174805 A1 | * | 8/2005 | Lee | 362/613 |
| 2008/0302407 A1 | | 12/2008 | Kobayashi | |
| 2009/0165841 A1 | * | 7/2009 | Gunn et al. | 136/245 |
| 2012/0273028 A1 | * | 11/2012 | Yen | 136/251 |

FOREIGN PATENT DOCUMENTS

| | | |
|---|---|---|
| CN | 2745227 Y | 12/2005 |
| CN | 101802324 A | 8/2010 |
| CN | 201652899 U | 11/2010 |
| TW | M254682 | 1/2005 |
| TW | M266561 | 6/2005 |
| TW | M330731 | 4/2008 |
| TW | M381987 | 6/2010 |

* cited by examiner

*Primary Examiner* — Brian Glessner
*Assistant Examiner* — Beth Stephan
(74) *Attorney, Agent, or Firm* — Winston Hsu; Scott Margo

(57) ABSTRACT

A solar device includes a frame, a solar cell module, an inverter and a fastener mechanism. The frame has a first edge and a second edge opposite to the first edge. The solar cell module is disposed in the frame. The fastener mechanism is used for fastening the frame. The fastener mechanism includes a base and a fastener member. The inverter is fixed on the base. A first end of the fastener member is pivotally connected to the base and a second end of the fastener member has a first extending portion, wherein the first end is opposite to the second end. The first extending portion has a protruding structure. When the first edge of the frame is disposed on the base, the fastener member can be rotated with respect to the base so as to engage the protruding structure with the second edge of the frame.

13 Claims, 10 Drawing Sheets

SOLAR DEVICE AND FASTENER MECHANISM THEREOF

This application claims the benefit of China Application No. 201210219937.9, which was filed on Jun. 28, 2012, and is incorporated herein by reference.

BACKGROUND OF THE INVENTION

1. Field of the Invention

The invention relates to a solar device and a fastener mechanism thereof and, more particularly, to a fastener mechanism capable of being assembled to or disassembled from a frame of a solar device rapidly.

2. Description of the Prior Art

Referring to FIG. 1, FIG. 1 is a rear view illustrating a solar device 1 of the prior art. As shown in FIG. 1, the solar device 1 comprises four frames 10 and an inverter 12. Each of two adjacent edges of the inverter 12 is fixed on each of two adjacent frames 10 by two screws 14. In general, it requires two laborers and about sixty seconds to assemble one inverter 12 onto the solar device 1 such that a manufacturer will waste a lot of time and effort on assembling and repairing the solar device 1 and the manufacture cost will increase accordingly. Furthermore, if the alignment is not precise enough to assemble the inverter 12 onto the solar device 1, teeth of the screws 14 and screw holes on the frames 10 may be broken so that the manufacture cost will also increase.

SUMMARY OF THE INVENTION

Therefore, an objective of the invention is to provide a solar device and a fastener mechanism thereof so as to solve the aforesaid problems.

According to an embodiment of the invention, a fastener mechanism is used for fastening a frame. The frame has a first edge and a second edge opposite to the first edge. The fastener mechanism comprises a base and a fastener member. A first end of the fastener member is pivotally connected to the base and a second end of the fastener member has a first extending portion, wherein the first end is opposite to the second end. The first extending portion has a protruding structure for engaging the second edge of the frame. When the first edge of the frame is disposed on the base, the fastener member is capable of rotating with respect to the base so as to engage the protruding structure with the second edge of the frame.

According to another embodiment of the invention, a solar device comprises a frame, a solar cell module, an inverter and a fastener mechanism. The frame has a first edge and a second edge opposite to the first edge. The solar cell module is disposed in the frame. The fastener mechanism is used for fastening the frame. The fastener mechanism comprises a base and a fastener member. The inverter is fixed on the base. A first end of the fastener member is pivotally connected to the base and a second end of the fastener member has a first extending portion, wherein the first end is opposite to the second end. The first extending portion has a protruding structure for engaging the second edge of the frame. When the first edge of the frame is disposed on the base, the fastener member is capable of rotating with respect to the base so as to engage the protruding structure with the second edge of the frame.

In this embodiment, an anode surface may be formed on the frame by anodizing the frame and the fastener member may be made of metal. When the protruding structure is engaged with the second edge of the frame, the protruding structure breaks the anode surface on the second edge so as to contact the second edge immediately. Accordingly, the solar device can be grounded through the fastener mechanism.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
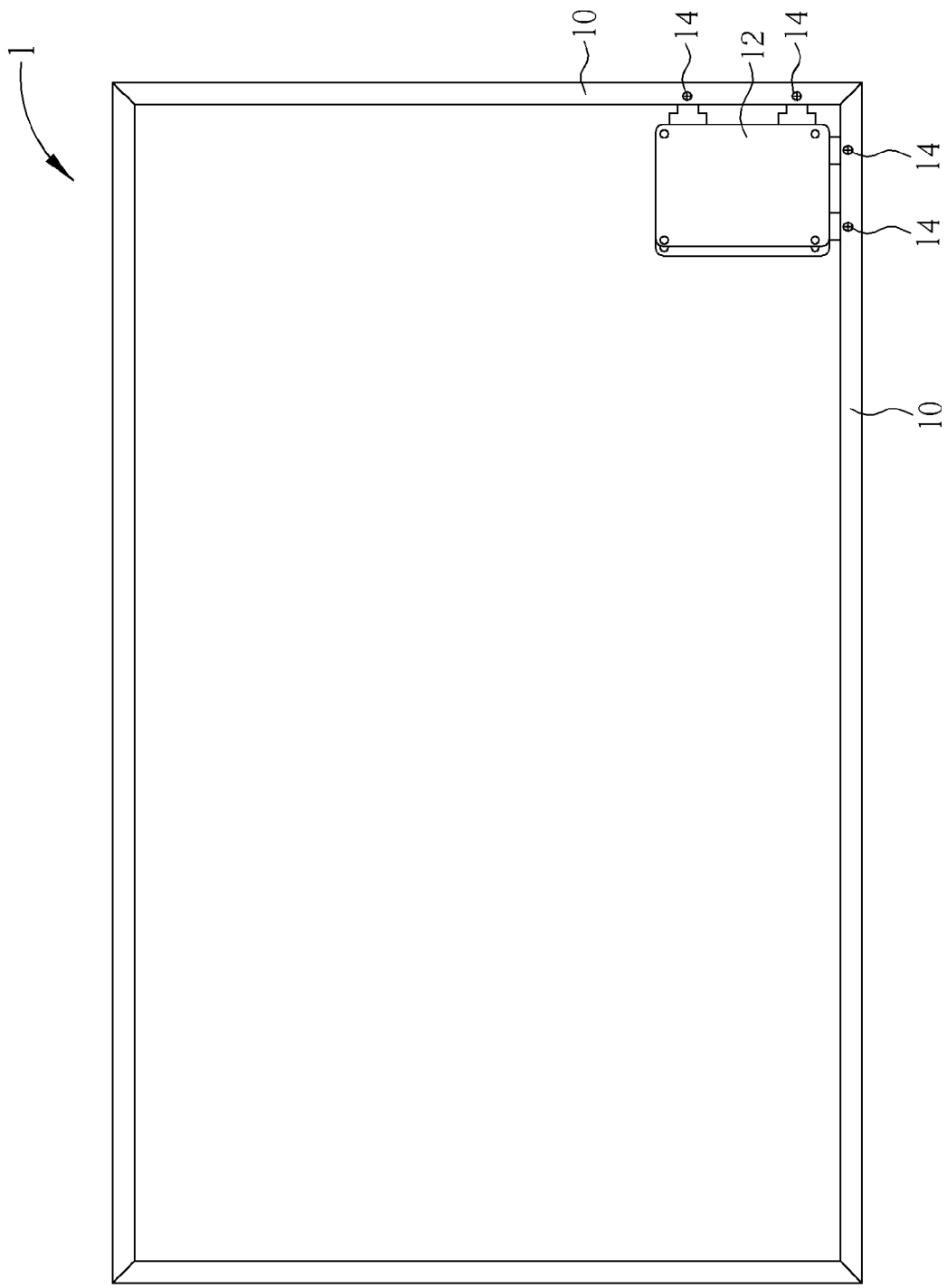
FIG. 1 is a rear view illustrating a solar device of the prior art.
Figure 2:
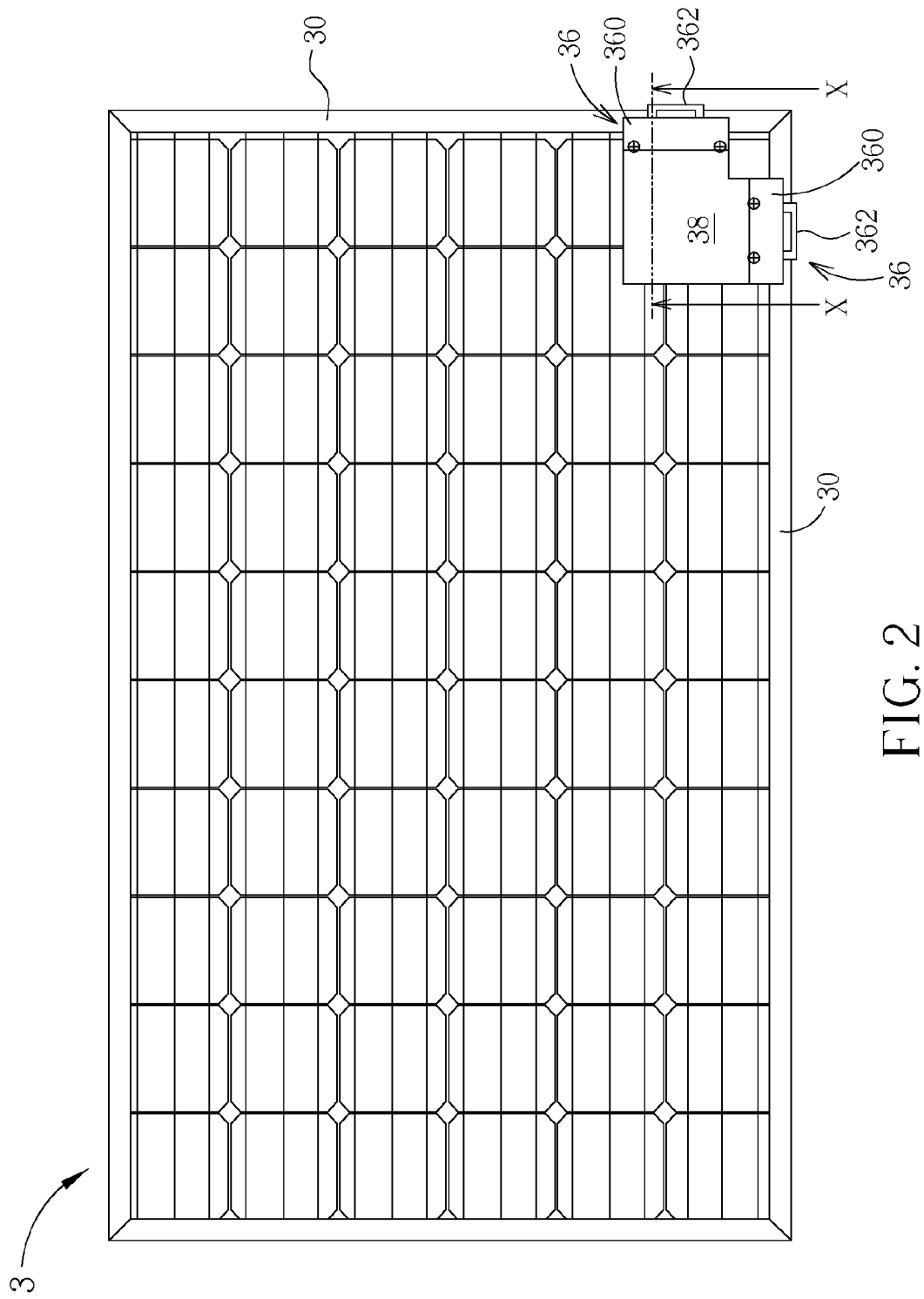
FIG. 2 is a rear view illustrating a solar device according to an embodiment of the invention.
Figure 3:
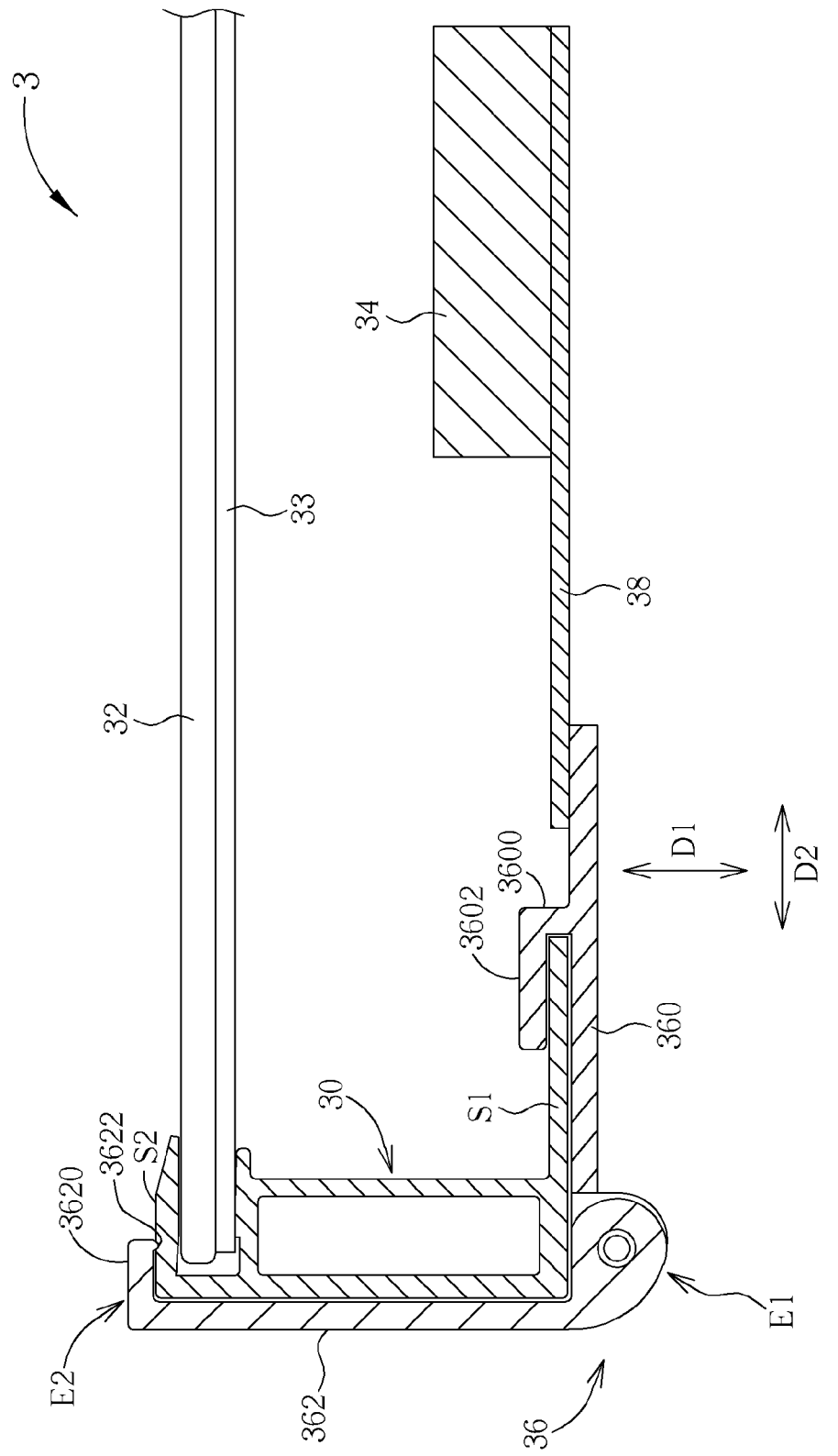
FIG. 3 is a cross-sectional view illustrating the solar device along line X-X shown in FIG. 2.
Figure 4:
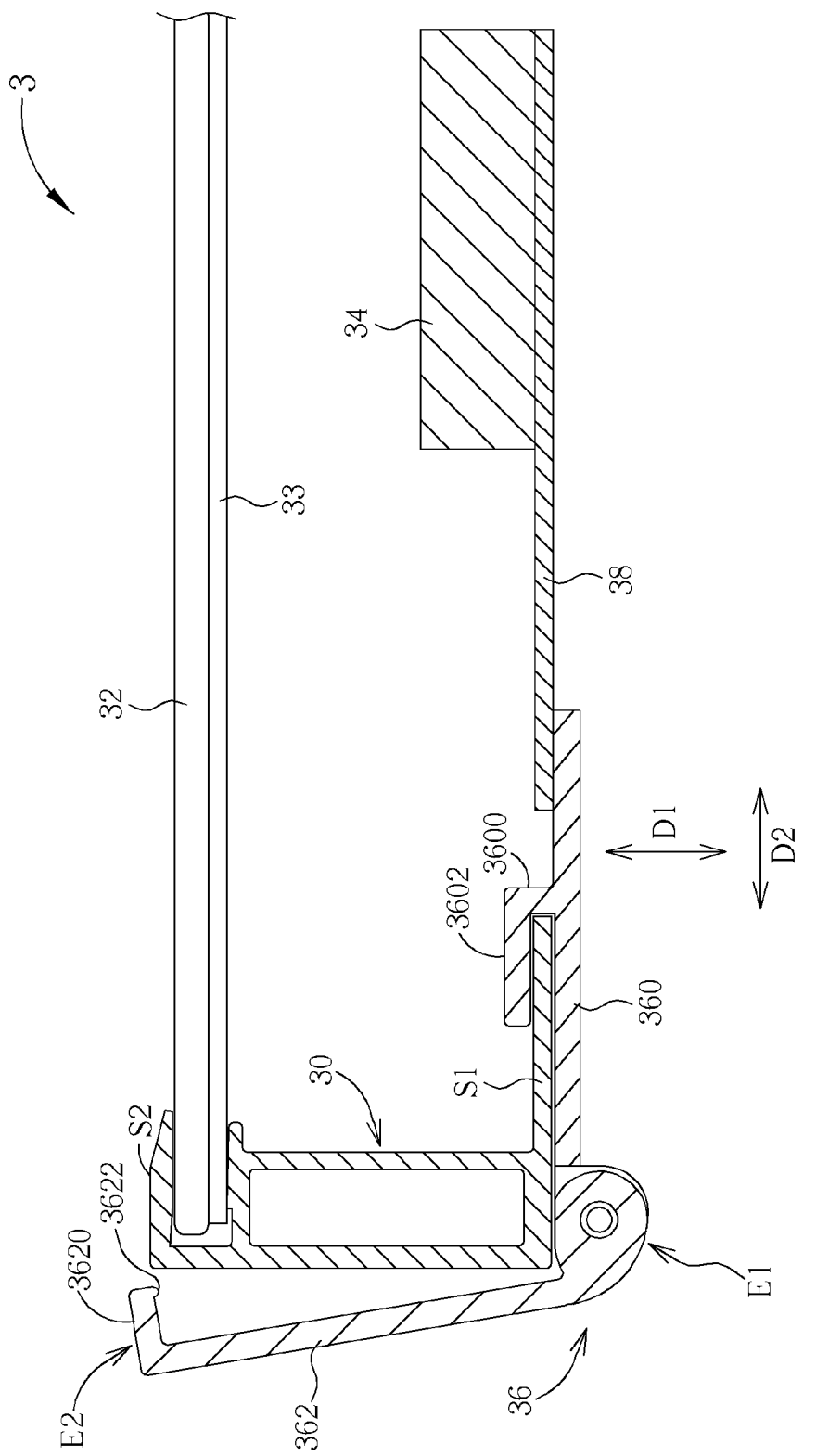
FIG. 4 is a cross-sectional view illustrating the fastener mechanism shown in FIG. 3 not fastened on the frame.

Referring to FIGS. 2 to 4, FIG. 2 is a rear view illustrating a solar device 3 according to an embodiment of the invention, FIG. 3 is a cross-sectional view illustrating the solar device 3 along line X-X shown in FIG. 2, and FIG. 4 is a cross-sectional view illustrating the fastener mechanism 36 shown in FIG. 3 not fastened on the frame 30. As shown in FIGS. 2 and 3, the solar device 3 comprises four frames 30, a solar cell module 32, a back sheet 33, an inverter 34, two fastener mechanisms 36 and a socket 38. The four frames 30 are connected to each other so as to form a rectangular shape. The solar cell module 32 and the back sheet 33 are disposed in the frames 30. Each of two adjacent edges of the inverter 34 is fixed on each of two adjacent frames 30 by one fastener mechanism 36. In general, there will be a tempered glass disposed on the solar cell module 32 and some necessary components disposed in the frames 30 for operation purpose, and those will not be depicted herein.

As shown in FIG. 3, the frame 30 has a first edge S1 and a second edge S2 opposite to the first edge S1. The fastener mechanism 36 is used for fastening the frame 30. The fastener mechanism 36 comprises a base 360 and a fastener member 362. A first end E1 of the fastener member 362 is pivotally connected to the base 360 and a second end E2 of the fastener member has a first extending portion 3620, wherein the first end E1 is opposite to the second end E2. The first extending portion 3620 has a protruding structure 3622 for engaging the second edge S2 of the frame 30. In this embodiment, the protruding structure 3622 is, but not limited to, half-circular. The base 360 has a restraining portion 3600 and a second extending portion 3602. The restraining portion 3600 protrudes from the base 360 in a direction D1 perpendicular to the base 360 and the second extending portion 3602 extends from the restraining portion 3600 in a direction D2 parallel to the base 360 such that the second extending portion 3602 and the restraining portion 3600 are formed as L-shape.

To assemble the solar device 3, the inverter 34 can be fixed on the socket 38 first and then the socket 38 can be fixed on one end of the base 360 by a screw. In other words, the inverter 34 can be fixed on the base 360 through the socket 38. Afterward, the fastener member 362 can be rotated with respect to the base 360 to an open state as shown in FIG. 4. Then, the first edge S1 of the frame 30 can be disposed on the base 360. When the first edge S1 of the frame 30 is disposed on the base 360, the restraining portion 3600 and the second extending portion 3602 both abut against the first edge S1 so as to restrain the first edge S1 from moving in the direction D2 parallel to the base 360 and in the direction D1 perpendicular to the base 360. Then, the fastener member 362 can be rotated with respect to the base 360 toward the frame 30 so as to engage the protruding structure 3622 with the second edge S2 of the frame 30. As shown in FIG. 3, when the protruding structure 3622 is engaged with the second edge S2 of the frame 30, the protruding structure 3622 butts into the second edge S2 such that the fastener mechanism 36 is fastened on the frame 30. On the other hand, the fastener member 362 can be rotated with respect to the base 360 away from the frame 30 so as to disengage the protruding structure 3622 from the second edge S2 of the frame 30 such that the inverter 34 can be disassembled from the frame 30. Accordingly, the inverter 34 together with the fastener mechanism 36 can be assembled to or disassembled from the frame 30 of the solar device 3 rapidly.

According to practical assembly testing results, it only requires one laborer and about ten seconds to assemble one inverter 34 onto the solar device 3 using the fastener mechanism 36 of the invention. Compared with the prior art, which requires two laborers and about sixty seconds, the invention can save about 50% laborer and 80% assembly time.

In general, an anode surface is usually formed on the frame 30 by anodizing the frame 30. If the fastener member 362 is made of metal and when the protruding structure 3622 is engaged with the second edge S2 of the frame 30, the protruding structure 3622 will break the anode surface on the second edge S2 so as to contact the second edge S2 immediately, so that the solar device 3 can be grounded through the fastener mechanism 36. It should be noted that, in another embodiment, the fastener member 362 may be made of plastic. In other words, the material of the fastener member 362 can be determined based on practical applications.

Figure 5:
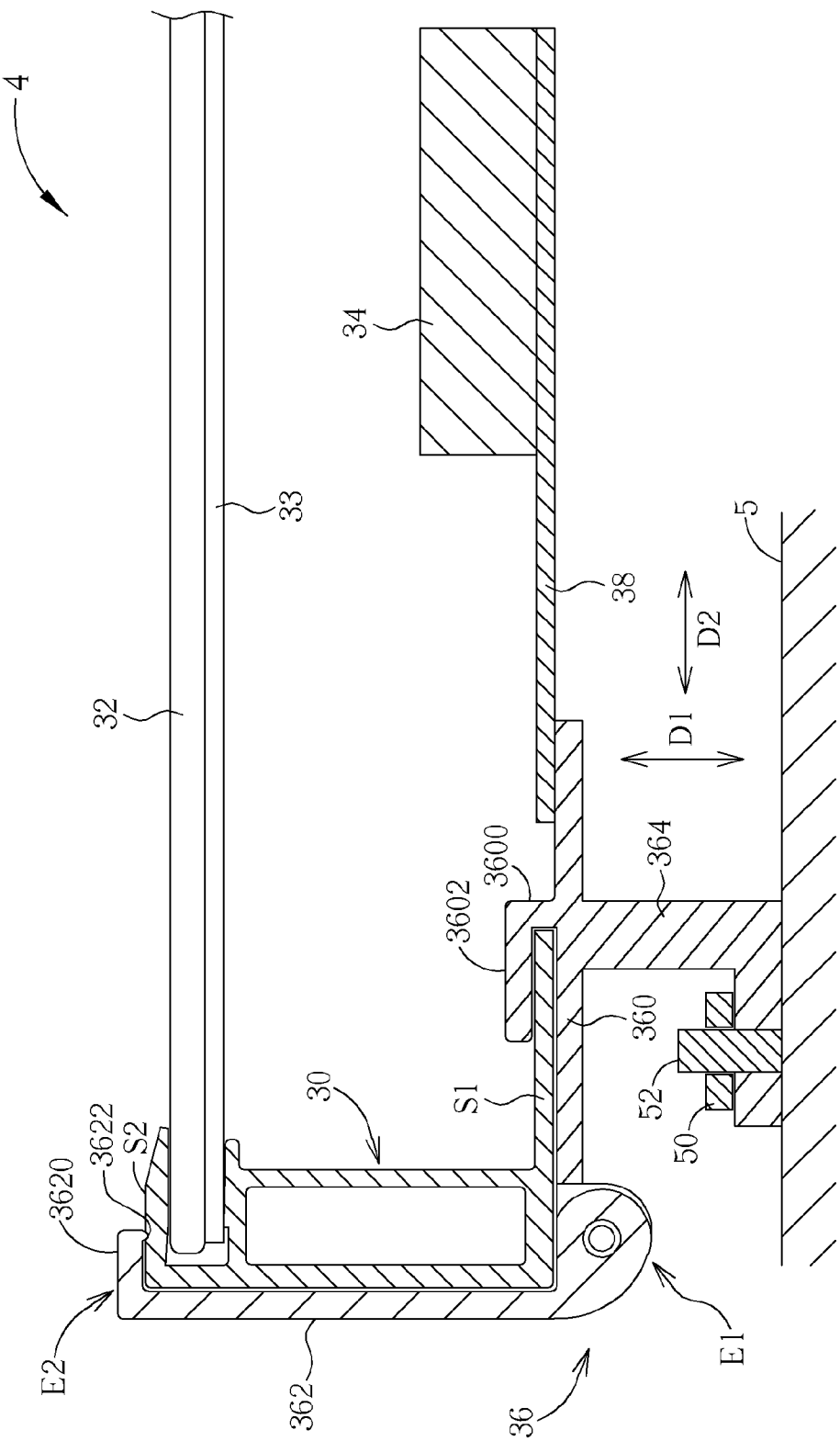
FIG. 5 is a cross-sectional view illustrating a solar device according to another embodiment of the invention.

Referring to FIG. 5, FIG. 5 is a cross-sectional view illustrating a solar device 4 according to another embodiment of the invention. The main difference between the solar device 4 and the aforesaid solar device 3 is that the fastener mechanism 36 of the solar device 4 further comprises a support member 364. As shown in FIG. 5, the support member 364 extends from the base 360 and is capable of being connected to a support rack 5. In this embodiment, the support member 364 can be fixed on a bolt 52 of the support rack 5 by a nut 50. In practical applications, the support rack 5 may be a roof or other racks for supporting the solar device 4. To assemble the solar device 4 onto the support rack 5, the fastener mechanism 36 can be fixed on the support rack 5 first and then the frame 30 of the solar device 4 can be assembled to or disassembled from the fastener mechanism 36 by the aforesaid assembly/disassembly manner. Accordingly, the solar device 4 can be assembled to or disassembled from the support rack 5 rapidly. It should be noted that the same elements in FIG. 5 and FIG. 3 are represented by the same numerals, so the repeated explanation will not be depicted herein again.

Figure 6:
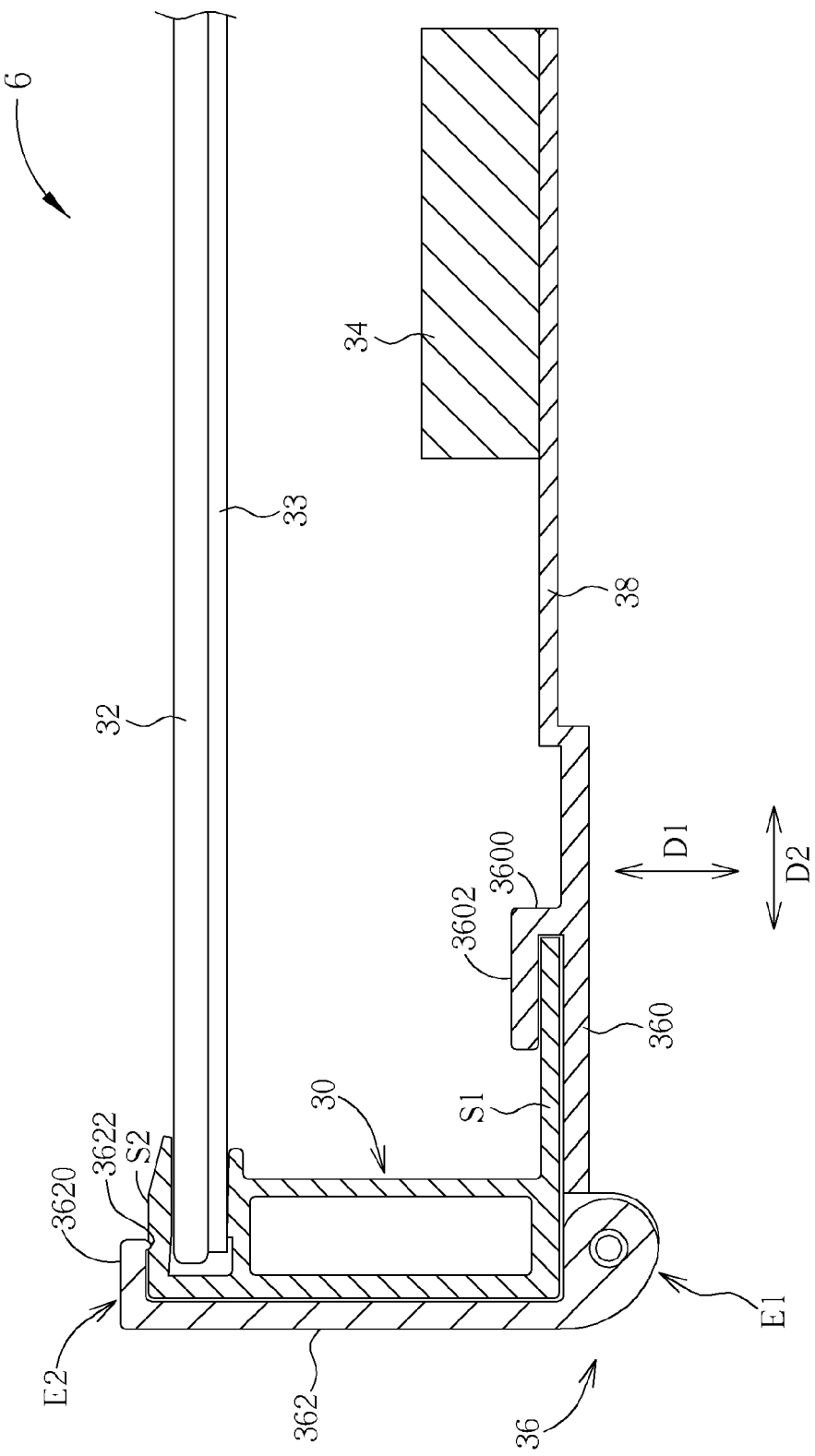
FIG. 6 is a cross-sectional view illustrating a solar device according to another embodiment of the invention.

Referring to FIG. 6, FIG. 6 is a cross-sectional view illustrating a solar device 6 according to another embodiment of the invention. The main difference between the solar device 6 and the aforesaid solar device 3 is that the socket 38 of the solar device 6 extends from one end of the base 360 and the inverter 34 is fixed on the socket 38. In other words, in this embodiment, the socket 38 and the base 360 are formed integrally. Accordingly, the assembly time of fixing the socket 38 onto the base 360 can be further saved. It should be noted that the same elements in FIG. 6 and FIG. 3 are represented by the same numerals, so the repeated explanation will not be depicted herein again.

Figure 7:
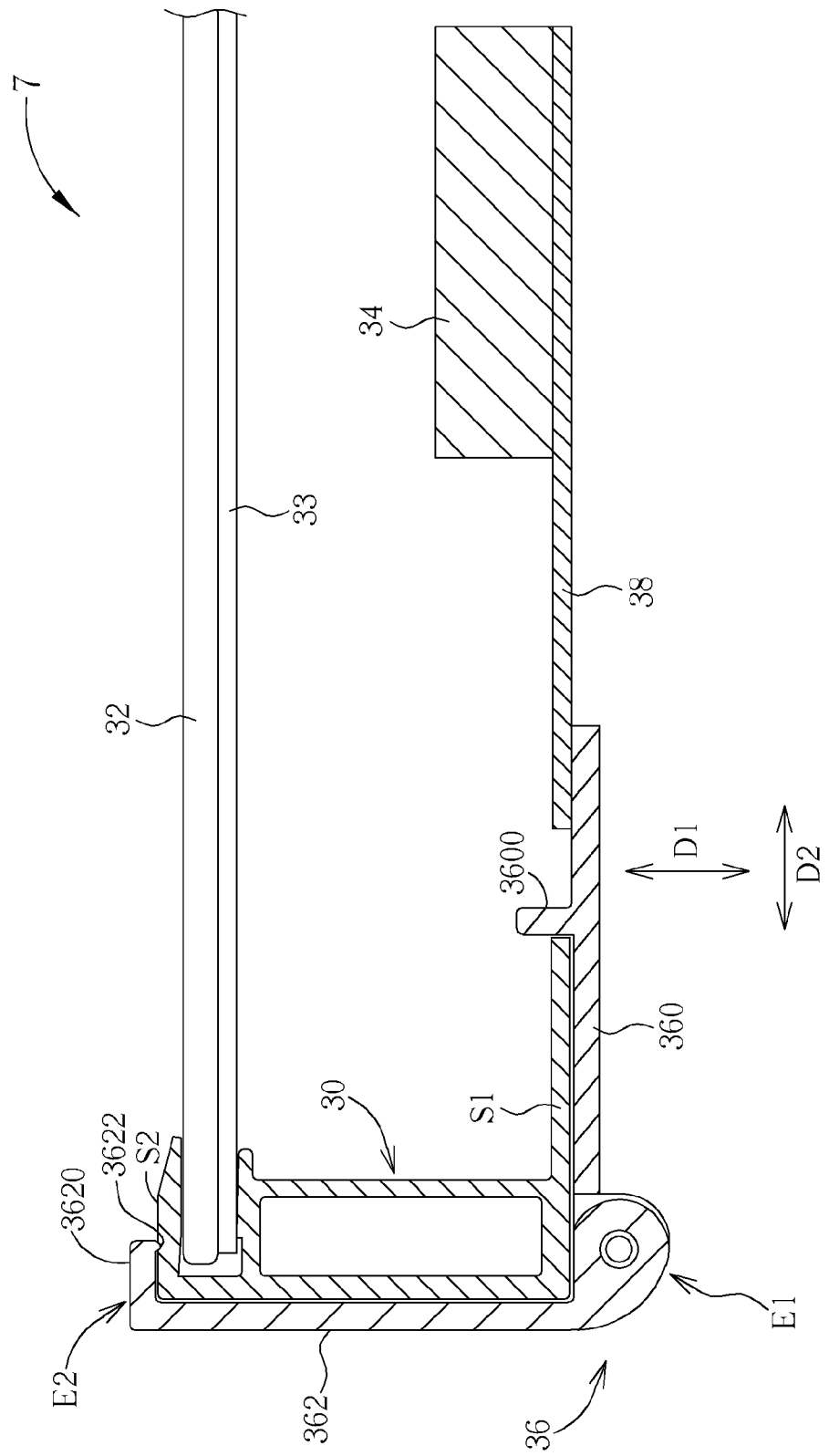
FIG. 7 is a cross-sectional view illustrating a solar device according to another embodiment of the invention.

Referring to FIG. 7, FIG. 7 is a cross-sectional view illustrating a solar device 7 according to another embodiment of the invention. The main difference between the solar device 7 and the aforesaid solar device 3 is that the base 360 of the solar device 7 does not have the second extending portion 3602 shown in FIG. 3. As shown in FIG. 7, the base 360 of the solar device 7 only has the restraining portion 3600 protruding from the base 360 in the direction D1 perpendicular to the base 360. When the first edge S1 of the frame 30 is disposed on the base 360, the restraining portion 3600 abuts against the first edge S1 so as to restrain the first edge S1 from moving in the direction D2 parallel to the base 360. It should be noted that the same elements in FIG. 7 and FIG. 3 are represented by the same numerals, so the repeated explanation will not be depicted herein again.

Figure 8:
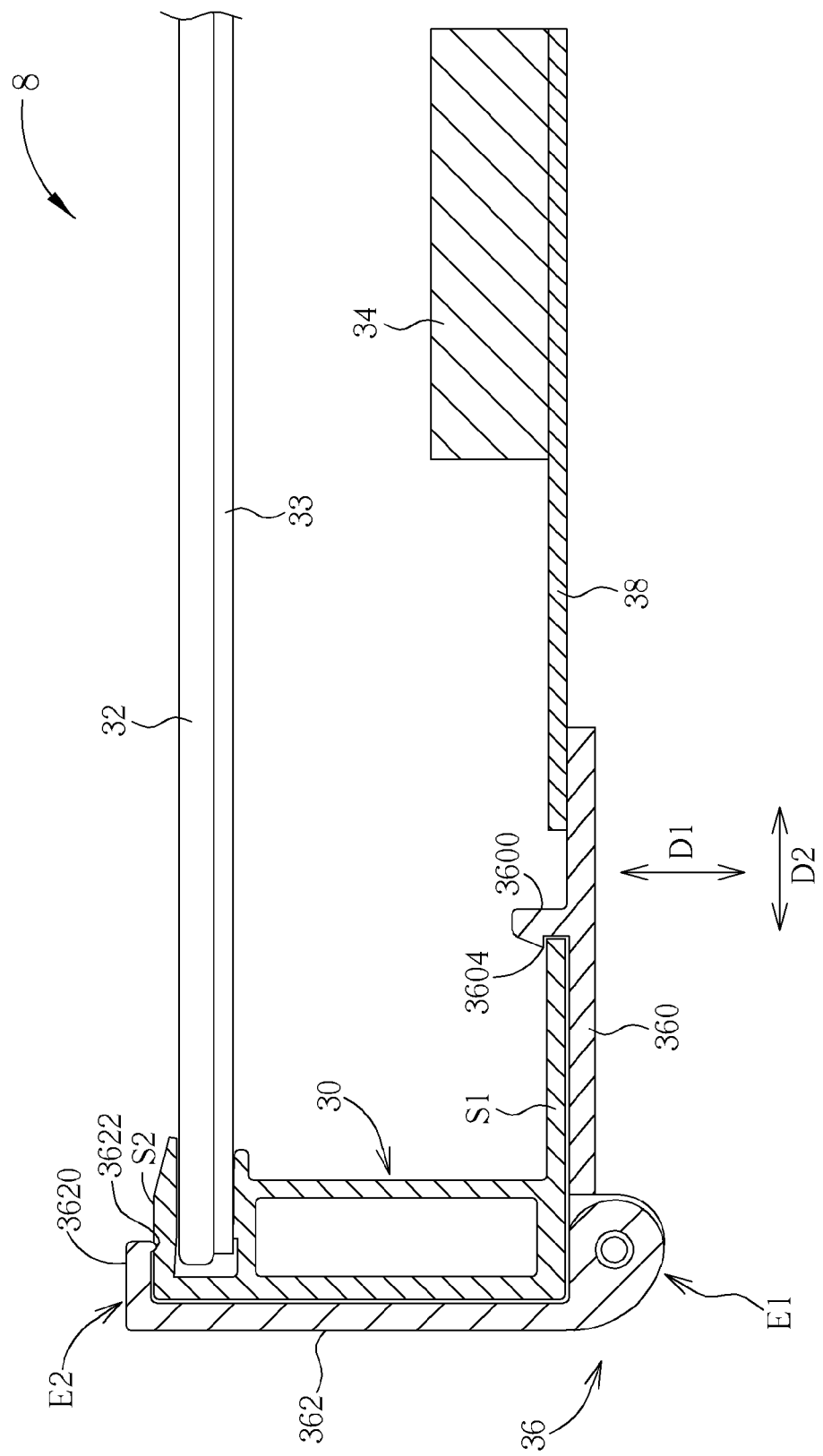
FIG. 8 is a cross-sectional view illustrating a solar device according to another embodiment of the invention.

Referring to FIG. 8, FIG. 8 is a cross-sectional view illustrating a solar device 8 according to another embodiment of the invention. The main difference between the solar device 8 and the aforesaid solar device 3 is that the base 360 of the solar device 8 further has a hook 3604 and does not have the second extending portion 3602 shown in FIG. 3. As shown in FIG. 8, the hook 3604 protrudes from the restraining portion 3600 in the direction D2 parallel to the base 360. When the first edge S1 of the frame 30 is disposed on the base 360, the restraining portion 3600 and the hook 3604 both abut against the first edge S1 so as to restrain the first edge S1 from moving in the direction D2 parallel to the base 360 and in the direction D1 perpendicular to the base 360. It should be noted that the same elements in FIG. 8 and FIG. 3 are represented by the same numerals, so the repeated explanation will not be depicted herein again.

Figure 9:
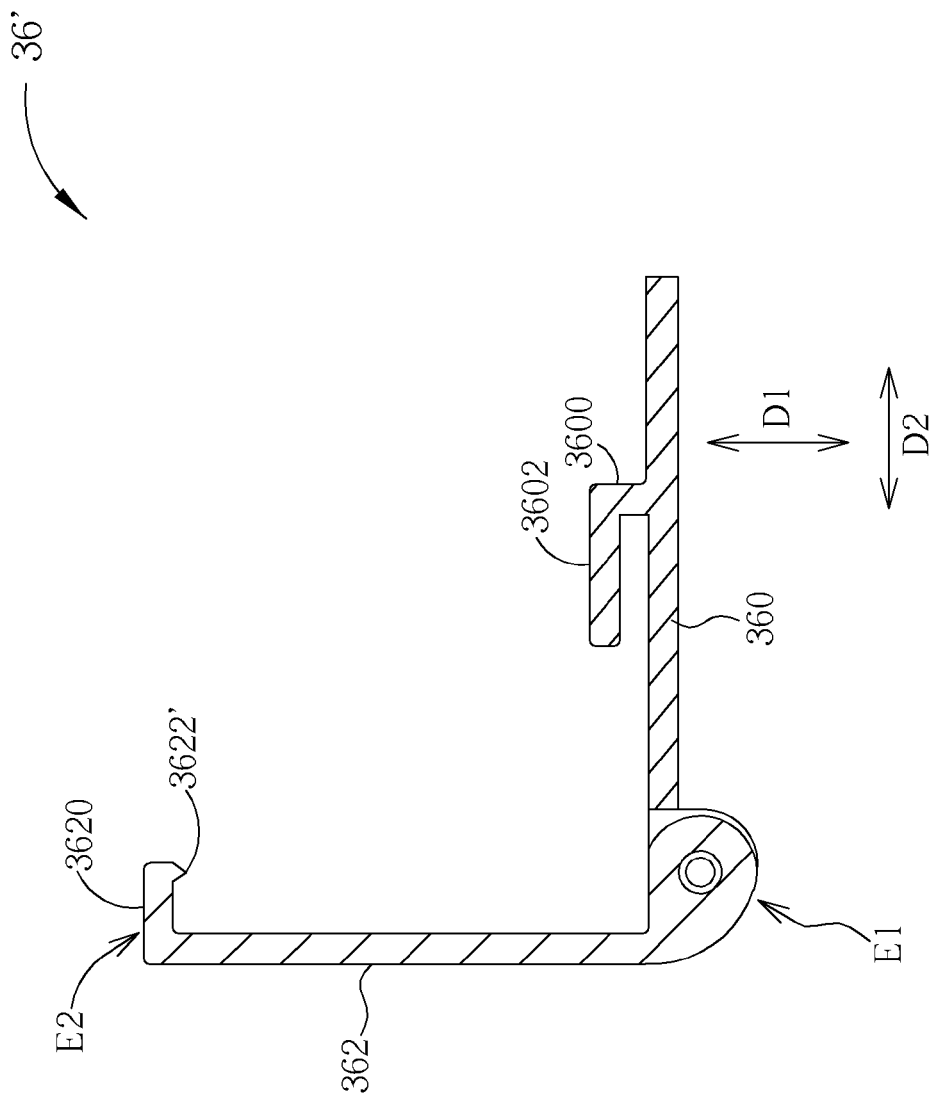
FIG. 9 is a cross-sectional view illustrating a fastener mechanism according to another embodiment of the invention.

Referring to FIG. 9, FIG. 9 is a cross-sectional view illustrating a fastener mechanism 36' according to another embodiment of the invention. The main difference between the fastener mechanism 36' and the aforesaid fastener mechanism 36 is that the protruding structure 3622' of the fastener mechanism 36' is taper-shaped. When the protruding structure 3622' is engaged with the second edge S2 of the aforesaid frame 30, the protruding structure 3622' butts into the second edge S2 such that the fastener mechanism 36' is fastened on the frame 30. It should be noted that the same elements in FIG. 9 and FIG. 3 are represented by the same numerals, so the repeated explanation will not be depicted herein again.

Figure 10:
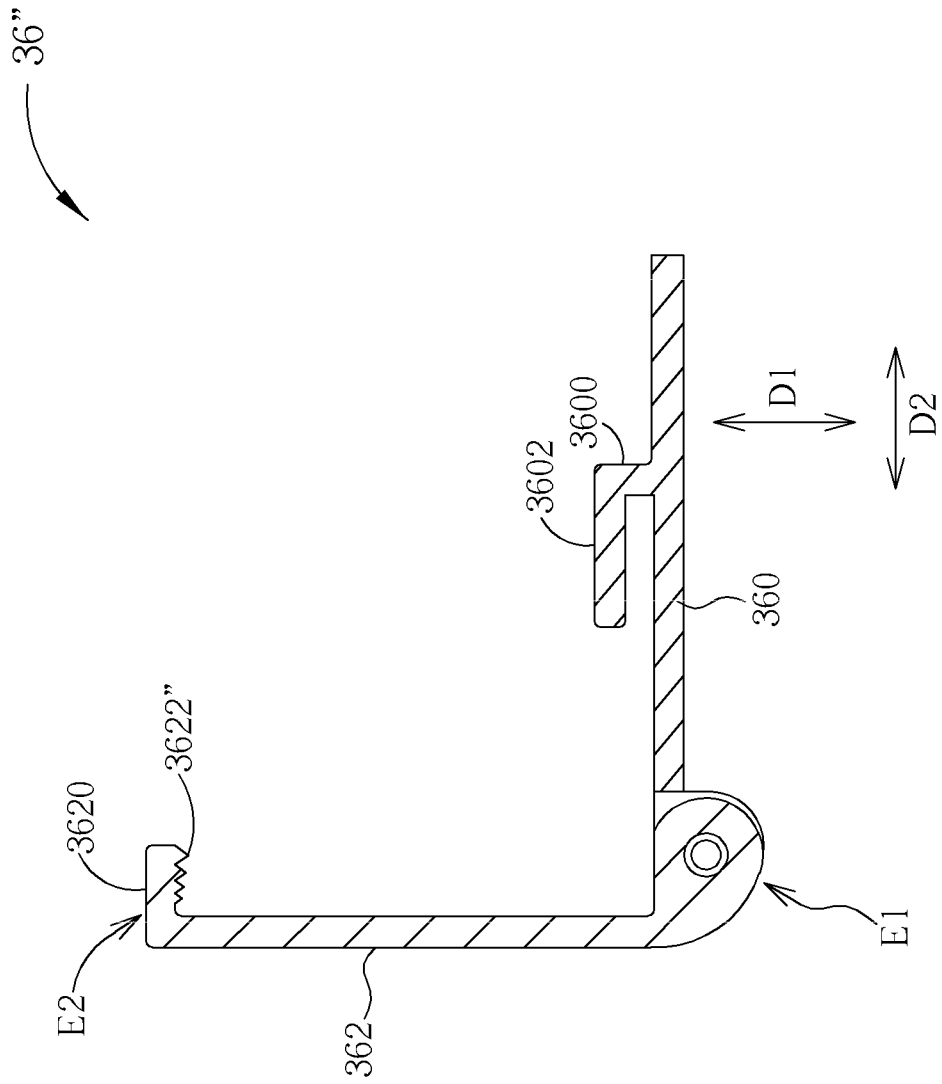
FIG. 10 is a cross-sectional view illustrating a fastener mechanism according to another embodiment of the invention.

Referring to FIG. 10, FIG. 10 is a cross-sectional view illustrating a fastener mechanism 36" according to another embodiment of the invention. The main difference between the fastener mechanism 36" and the aforesaid fastener mechanism 36 is that the protruding structure 3622" of the fastener mechanism 36" is sawtooth-shaped. When the protruding structure 3622" is engaged with the second edge S2 of the aforesaid frame 30, the protruding structure 3622' butts into the second edge S2 such that the fastener mechanism 36' is fastened on the frame 30. It should be noted that the same elements in FIG. 10 and FIG. 3 are represented by the same numerals, so the repeated explanation will not be depicted herein again.

Compared with the prior art, the invention utilizes the rotatable fastener mechanism to fasten the frame of the solar device. To assemble the solar device of the invention, the inverter can be fixed on the base of the fastener mechanism first. Afterward, the first edge of the frame of the solar device is disposed on the base of the fastener mechanism. Then, the fastener member can be rotated with respect to the base toward the frame so as to engage the protruding structure with the second edge of the frame. Consequently, the fastener mechanism is fastened on the frame. On the other hand, the fastener member can be rotated with respect to the base away from the frame so as to disengage the protruding structure from the second edge of the frame such that the inverter can be disassembled from the frame of the solar device. Accordingly, the inverter together with the fastener mechanism can be assembled to or disassembled from the frame of the solar device rapidly. In general, an anode surface is usually formed on the frame by anodizing the frame. If the fastener member is made of metal and when the protruding structure is engaged with the second edge of the frame, the protruding structure will break the anode surface on the second edge so as to contact the second edge immediately, so that the solar device can be grounded through the fastener mechanism.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fastener mechanism capable of being detachably fastened to a frame, the frame having a first edge and a second edge opposite to the first edge, the fastener mechanism comprising:
   a base; and
   a fastener member, a first end of the fastener member being pivotally connected to the base, a second end of the fastener member having a first extending portion, the first extending portion having a protruding structure capable of being embedded in the second edge, the first end being opposite to the second end;
   wherein the first edge of the frame is disposed on the base, the fastener member is capable of rotating with respect to the base so as to embed the protruding structure in the second edge of the frame;
   wherein the base has a restraining portion and a hook, the restraining portion protrudes from the base in a direction perpendicular to the base, and the hook protrudes from the restraining portion in a direction parallel to the base, such that an accommodating space is formed between the hook, the restraining portion and the base, the hook cooperates with the restraining portion to clamp a front end of the first edge of the frame in the accommodating space.

2. The fastener mechanism of claim 1, wherein the protruding structure is half-circular, taper-shaped, or sawtooth-shaped.

3. The fastener mechanism of claim 1, wherein an anode surface is formed on the frame by anodizing the frame, the fastener member is made of metal, when the protruding structure is engaged with the second edge of the frame, the protruding structure breaks the anode surface on the second edge so as to contact the second edge immediately.

4. The fastener mechanism of claim 1, further comprising a support member extending from the base and being capable of being connected to a support rack.

5. A solar device comprising:
   a frame having a first edge, a second edge opposite to the first edge, and an end extending between the first and second edges;
   a solar cell module disposed in the frame;
   an inverter; and
   a fastener mechanism detachably fastened to the frame, the fastener mechanism comprising:
      a base, the inverter being fixed on the base; and
      a fastener member having a first end, a second end and a center portion extending between the first end and the second end, the first end being pivotally connected to the base, a first extending portion extending from the second end, the first extending portion having a protruding structure engaged with the second edge, the first end being opposite to the second end;
   wherein the first edge of the frame is disposed on the base, the fastener member is capable of rotating with respect to the base so as to engage the protruding structure with the second edge of the frame.

6. The solar device of claim 5, further comprising a socket extending from one end of the base, the inverter being fixed on the socket.

7. The solar device of claim 5, further comprising a socket fixed on one end of the base, the inverter being fixed on the socket.

8. The solar device of claim 5, wherein the base has a restraining portion, the restraining portion protrudes from the base in a direction perpendicular to the base, when the first edge of the frame is disposed on the base, the restraining portion abuts against the first edge.

9. The solar device of claim 8, wherein the base further has a hook, the hook protrudes from the restraining portion in a direction parallel to the base, when the first edge of the frame is disposed on the base, the hook abuts against the first edge.

10. The solar device of claim 8, wherein the base further has a second extending portion, the second extending portion extends from the restraining portion in a direction parallel to the base, the second extending portion and the restraining portion are formed as L-shape, when the first edge of the frame is disposed on the base, the second extending portion abuts against the first edge.

11. The solar device of claim 5, wherein the protruding structure is half-circular, taper-shaped, or sawtooth-shaped.

12. The solar device of claim 5, wherein an anode surface is formed on the frame by anodizing the frame, the fastener member is made of metal, when the protruding structure is engaged with the second edge of the frame, the protruding structure breaks the anode surface on the second edge so as to contact the second edge immediately.

13. The solar device of claim 5, wherein the fastener mechanism further comprises a support member extending from the base and being capable of being connected to a support rack.

* * * * *